May 21, 1940.　　　　F. HARVEY　　　　2,201,679
TROLLEY COLLECTOR FOR BUS BAR CONDUIT SYSTEMS
Filed Jan. 17, 1938　　　2 Sheets-Sheet 1
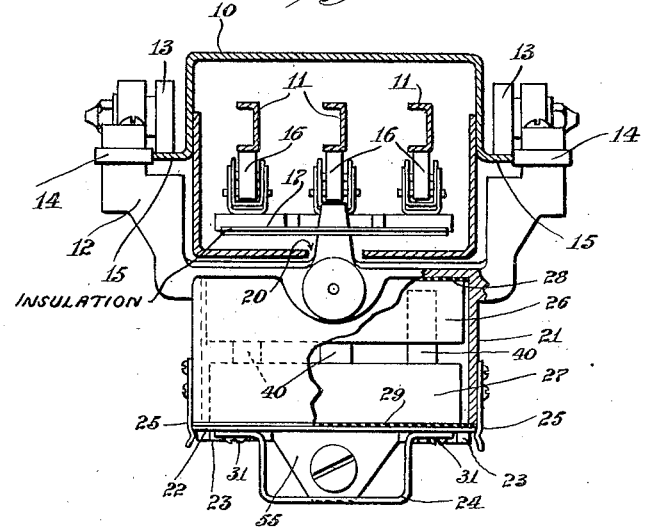
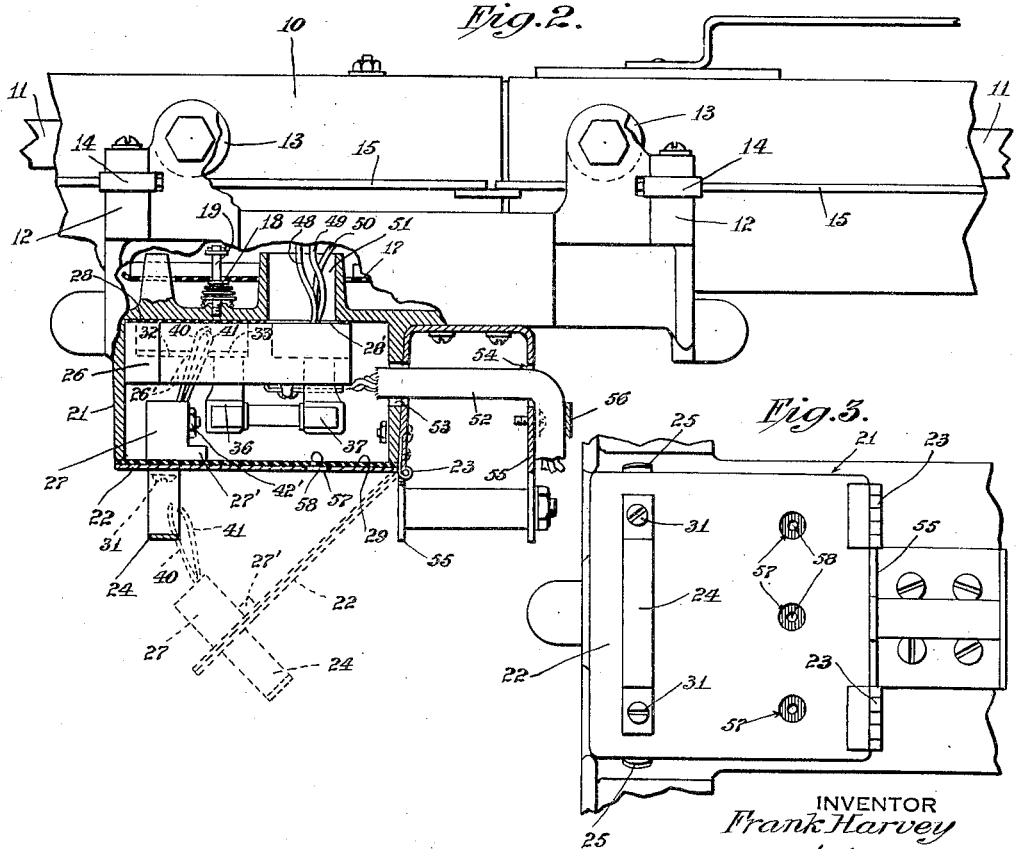
INVENTOR
Frank Harvey
BY
ATTORNEY May 21, 1940. F. HARVEY 2,201,679
TROLLEY COLLECTOR FOR BUS BAR CONDUIT SYSTEMS
Filed Jan. 17, 1938 2 Sheets-Sheet 2
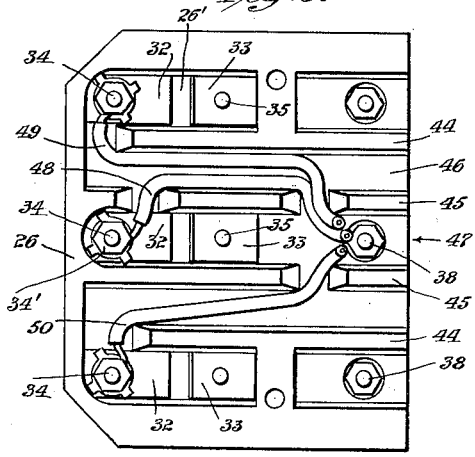
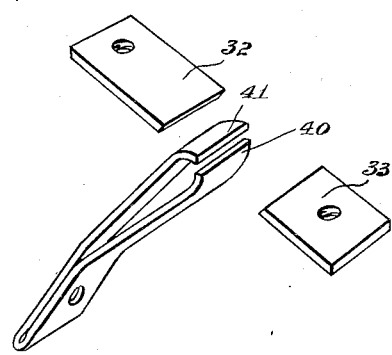
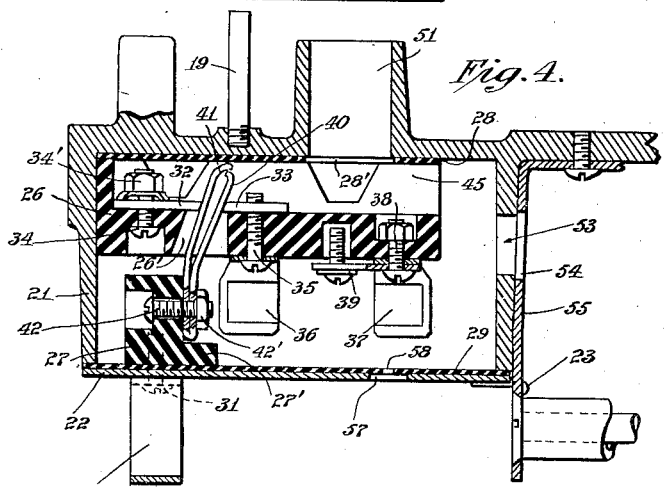
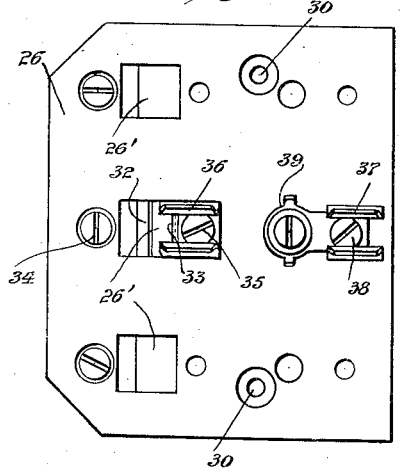
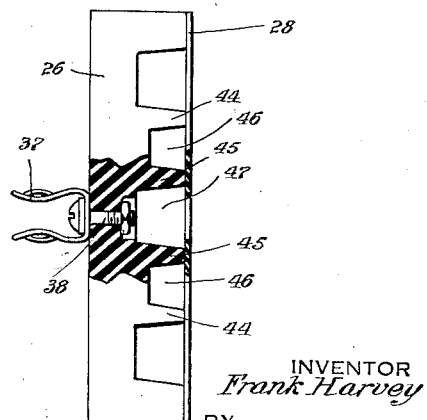
INVENTOR
Frank Harvey
BY
ATTORNEY Patented May 21, 1940

2,201,679

UNITED STATES PATENT OFFICE 2,201,679

TROLLEY COLLECTOR FOR BUS BAR CONDUIT SYSTEMS

Frank Harvey, Cincinnati, Ohio, assignor to The Trumbull Electric Manufacturing Company, Plainville, Conn., a corporation of Connecticut Application January 17, 1938, Serial No. 185,265

7 Claims. (Cl. 200—114)

One object is to provide a reliable device of this character by which a branch circuit may be protected and opened or closed.

Another object is to provide a trolley collector with a simple and compact switch.

Another object is to provide a trolley collector with means for opening the branch circuit before the circuit protective devices are exposed, thus avoiding any possibility of touching live parts.

In order to ensure reliability in a compact device of this character many refinements and improvements in details will be found embodied.

The trolley has a body with rollers for supporting and guiding it along a bus bar conduit and contact devices engaging the bus bars in the conduit. The fuses or other protective devices for the branch circuit are mounted in a chamber or box beneath the contacts. The cover of this chamber is hinged to the box and carries a switch member which controls the branch circuit. All of these parts are designed for a maximum of simplicity and strength and electrical protection.

Fig. 1 is an end view and partial section of a trolley involving one form of my invention with the fuse box closed and showing a bus bar conduit in transverse section.

Fig. 2 is a side view and partial section of the same parts as shown in Fig. 1, the cover and switch blades being also shown in dotted lines in an open circuit position.

Fig. 3 is a bottom view of the fuse box portion of the trolley, the cover being shown closed.

Fig. 4 is a longitudinal sectional view of the fuse box with the switch closed.

Fig. 5 is a plan view of the insulating block of the fuse block and showing the conductors.

Fig. 6 is a face view of the insulating block with some of the conducting parts attached and others omitted.

Fig. 7 is a cross sectional view of the insulating block and its cover.

Fig. 8 is a perspective view of one set of switch members.

The conduit or bus bar housing 10 encloses the bus bars 11 and supports them in any suitable manner.

The trolley has a body portion 12 suitably constructed and carrying rollers 13 and 14 which coact with tracks 15 at the sides of the conduit to support and guide the trolley as it is moved from place to place.

Inside the conduit are the contact members, shoes or rollers 16 preferably carried by an insulating plate 17 which in turn is supported by posts 19 and spring 18 carried by the body 12 so that the plate can tilt and adjust itself in position to maintain the contacts 16 in good electrical engagement with the bus bars. This is more fully described and claimed in my application Serial Number 62,213 filed February 3, 1936 now patent No. 2,117,480, dated May 17, 1938.

In the bottom of the conduit is a slot 20 through which the posts 19 extend.

The fuse and switch box 21 is formed as a part of the lower part of the body entirely outside of the bus bar conduit. This box has a door or cover 22 which is hinged at 23 to one edge of the box and has a handle 24 at an opposite edge for convenience in opening and closing the cover. One or more spring catches 25 may be provided to frictionally hold the cover in the closed position.

Inside of the box are supported two insulating members, a block 26 and a bar 27 with insulating sheets 28 and 29 interposed between them and the adjacent wall of the box. The block 26 and the sheet 28 are secured in place by one or more screws extending through holes such as 30 and seated in the top of the box.

The handle 24, the bar 27 and the sheet 29 may be all secured to the cover by one or more screws 31.

The form shown is adapted to a three wire system but of course the invention is not limited to the control of any particular number of circuits. It will be necessary to refer only to the unit of one circuit. Each switch unit has stationary contact plates 32 and 33 secured to the block 26 by screws 34 and 35, respectively. Screw 34 serves as a binding post for the clamp nut 34' for attachment of one of the wires leading to one of the contacts such as 16. The screw 35 also holds a fuse clip 36. The companion clip 37 is secured in place by the screw 38 which also holds the branch circuit terminal 39.

The movable switch member consists of two spring fingers 40 and 41, one of which is longer than the other and preferably integrally connected or formed from a single strip of suitable metal bent at its approximate center and loosely connected to the cross bar 27 by a screw 42 which passes freely through the bar and screws into the switch member. The ends of the arms or fingers are bowed somewhat so as to afford greater resiliency and a wider range of spring action. The curl of the shorter arm seats within the curl of the longer so that a large degree of compression is possible. This allows for a great deal of variation in the spacing of the contacts. The nut 42' acts as a lock nut against the resilient fingers. The bar 27 has a shoulder 27' which serves as an abutment for the switch member, and also as additional insulation between the switch member and the inside of the cover. The switch member passes through the hole 26' in the insulating block to engage the contacts 32 and 33 and is inclined substantially at a tangent to the direction of motion so as to afford a good contact within the limited space allowed by the small size of the box and cover. The loose or floating mounting and the spring action of the switch member are also desirable to assist in adjusting or adapting the members to the stationary contacts whose edges are preferably bevelled or inclined.

The upper side of the block 26 is provided with ribs 44 and 45 and grooves, recesses or channels such as 46 and 47 between them for the contacts 32, 33 and for the conductors 48, 49 and 50 which connect the respective binding posts such as 34 to the proper bus bar contact roller 16. These conductors are housed in these grooves between the walls of the insulating block 26 and the insulating sheet 28 and pass upwardly through opening 28' in sheet 28 and through the tubular extension 51 to near the platform or plate 17 where they are connected to the respective contact rollers 16. This tubular member serves to protect the conductors from damage as the trolley is moved along the conduit. The branch circuit conductors 52 which are connected to the terminals 39 pass through the opening 53 in the wall of the box and through opening 54 in the yoke 55 and are gathered together and held by a clamp 56.

For convenience in testing the branch circuits, I preferably provide passages 57 in the cover 22 and smaller holes 58 in the insulating sheet 29 so that testing points may be inserted to engage the fuse clips adjacent the respective openings without danger of grounding or short circuiting.

It will be seen from the foregoing that the circuit protecting fuses are entirely enclosed and that access to conducting parts of the trolley cannot be had until the cover of the fuse box is opened—which opening automatically breaks the branch circuit above the protective fuses. Even then the only live contact or part is the contact plate 32 (the screw 34 being sealed as usual) which is housed above the insulating block 26 where it is only with difficulty accessible through an opening 26'.

These openings or passages 26' are only slightly larger than the cross section of the switch members 40—41 and thus permit the insertion of the switch members but serve as arc repressers or restricters when the switch members are withdrawn.

The construction and arrangement of the insulating block 26 permits of the use of a shallow box and the construction and arrangement of the contacts and switch members make it possible to obtain good electrical connection in a small space with a considerable tolerance for commercial production.

By turning the branch terminals 39 in between the fuse clips, it is possible to save considerable space longitudinally.

By locating the lead out holes 53 and 54 approximately at the level of the end of the supporting block 26, the load wires can be readily pulled out directly.

It will be seen that the incoming wires traverse the greater part of the length of the base block above it in the chamber formed between the block 26 and the insulating sheet 28. Current goes from the bus bar or line contacts and terminals through the switch contacts (when the switch is closed) to the load or branch circuit terminals in a direction reverse to that of the incoming wires. From the switch contact connection is made directly to the first fuse clip directly beneath it. Current then passes through the fuses to the second fuse clip where connection is made to the load circuit.

The entire device is thus compact and yet effective and safe.

I claim:

1. A trolley collector having a body with bus bar contacts on the upper side and a chamber with spaced branch switch contacts on the lower side, a movable cover for said chamber having a switch member for closing the branch circuit when the cover is closed and breaking the branch circuit when the cover is opened, said switch member having two spring arms electrically connected together and loosely mounted at one end on an insulating bar and free at the other end in the chamber and having overlapping ends curved toward each other at their free ends for insertion between said contacts, said arms yielding toward each other when inserted between the contacts.

2. In an electric switch, a box having a cover hinged to one edge thereof, pairs of stationary contacts supported in the box and having their contact edges spaced apart, an insulating bar carried by the cover, switch members loosely carried by said bar, each switch member consisting of two spring arms with their free ends spaced apart and curled toward each other, one arm being somewhat longer than the other, said ends being adapted to be inserted and compressed between the contact edges of said contacts.

3. Switching means including a box having a cover hinged to one edge thereof, an insulating base mounted in the box and having arc confining openings therethrough, a pair of opposed switch contacts secured to the base adjacent opposite edges of each opening, each contact having an edge slanting at an acute angle to the plane of the base and spring switch arms loosely carried by the cover, curved toward each other at their tips and extending at acute angles to the cover and swingable in an arc through said openings to insert the tips thereof between the slanting edges of the contacts.

4. Switching means including a box having a chamber with an outlet on the top for conductors and a side inlet for conductors, an insulating base secured in the chamber having channels in their upper face and having arc-restricting passages through the base, a pair of contacts mounted in a channel on the top of the base at opposite edge of the opposite edges of each passage, a cover hinged to the box for closing the bottom thereof, switch members carried by the cover and insertable through said passages to engage said contacts, each switch member having two spring arms connected at one end of each to the cover but insulated therefrom, the opposite ends of the switch member arms being spaced apart and curved toward each other and one being longer than the other, said arms being compressed when inserted between the coacting contacts.

5. A connector switch having a body with electric terminals at its upper face and a depending box-like body having a hinged cover, an insulating base secured in the upper part of the body and having spaced walls providing channels between them and transverse passages extending through the base between the walls, pairs of spaced contact plates secured in said channels in the upper face of the base at opposite edges of said passages, one plate of each pair also constituting a wire terminal, conductors extending through the upper wall of the box body and connected respectively to a wire terminal plate of each pair of contact plates, pairs of fuse clips mounted on the lower face of said base, one of the clips of each pair of clips being connected to one of the remaining contact plates of a pair, branch conductors extending through a side wall of the box body and connected to the remaining clips and resilient switch members carried by the cover and extending through said passages and connecting the contact plates of the respective pairs of contact plates when the cover is closed.

6. A conduit branch connector having a body with contacts for coacting with the bus bars in a conduit and a depending box-like body having a cover closing it below, an insulating base secured in the upper part of the body and having channels with pairs of spaced contacts secured to the upper face of the base in said channels and passages through the base leading to said contacts, conductors extending through a wall of the box body and connected respectively to one contact of each pair of contacts between the base and the adjacent wall of the body, pairs of fuse holders mounted on the lower face of said base, one of the holders of each pair of holders being connected to one of the remaining contacts, branch conductors extending through a wall of the box body and connected to the remaining holders and loosely mounted switch members carried by the cover and extending through said passages and connecting the contacts of the respective pairs of contacts on the upper face of the base when the cover is closed.

7. A trolley connector having in combination a body with a contact on its upper face for coacting with a bus bar in a conduit and a fuse box having a cover closing it below, an insulating base secured in the upper part of the box and having a groove with a pair of spaced switch contacts secured in the upper face of the base, said base having an arc-restricting passage leading to said contacts, a conductor extending through a wall of the box into said groove and connected to one of said contacts in said groove, a pair of fuse clips mounted on the lower face of said base, one of said clips being connected to the remaining contact of said pair, a branch conductor extending through a wall of the box and connected to the remaining clip beneath said base, and a switch member carried by the cover and extending through said passage and connecting the contacts of the respective pair of contacts when the cover is closed.

FRANK HARVEY.